United States Patent [19]

Hofmann et al.

[11] Patent Number: 5,323,417
[45] Date of Patent: Jun. 21, 1994

[54] METALLURGICAL VESSEL FOR DIRECT-CURRENT ARC EQUIPMENT

[75] Inventors: Werner Hofmann, Feldstrasse; Franz-Rudolf Block, Kalfstrasse, both of Fed. Rep. of Germany

[73] Assignee: Mannesmann Aktiengesellschaft, Dusseldorf, Fed. Rep. of Germany

[21] Appl. No.: 939,484

[22] Filed: Sep. 3, 1992

[30] Foreign Application Priority Data

Sep. 4, 1991 [DE] Fed. Rep. of Germany ....... 4129756

[51] Int. Cl.⁵ .............................................. H05B 7/00
[52] U.S. Cl. ........................................ 373/72; 373/71; 373/108
[58] Field of Search ...................... 373/72, 71, 108, 44, 373/45, 52, 53, 60, 65, 88

[56] References Cited

U.S. PATENT DOCUMENTS

| | | | |
|---|---|---|---|
| 941,419 | 11/1909 | Keller | 373/72 |
| 1,674,982 | 6/1928 | Moore | 373/72 |
| 2,363,582 | 11/1944 | Gerber et al. | 373/71 |
| 4,277,638 | 7/1981 | Stenkvist | 373/72 |
| 4,324,943 | 4/1982 | Stenkvist et al. | 373/72 |
| 4,532,633 | 7/1985 | Stenkvist | 373/72 |
| 4,637,033 | 1/1987 | Buhler | 373/72 |
| 4,730,338 | 3/1988 | Guido | 373/108 |
| 4,829,538 | 5/1989 | Hlawatschek et al. | 373/72 |
| 5,142,650 | 8/1992 | Kida et al. | 373/72 |

*Primary Examiner*—Bruce A. Reynolds
*Assistant Examiner*—Tu Hoang
*Attorney, Agent, or Firm*—Schweitzer Cornman & Gross

[57] ABSTRACT

An anode of a direct-current arc furnace is provided in the region of the bottom of the vessel, characterized in that a metallic, broom-like element, having bristles directed towards the interior of the vessel, is positioned in a region of the furnace vessel which is free of refractory material and subsequently, at least in the region of the broom-like element, refractory gunite is applied thereto and a metallic composition is admixed during the guniting, and as the thickness of the applied gunite increases, the ratio of the metallic composition to the refractory composition is reduced, gunite only being sprayed exclusively in the region of the inner edge of the ladle. The practice of the method results in a metallurgical vessel for direct-current arc equipment, which has a cathode protruding into the vessel and at least one anode disposed in the refractory lining of the vessel characterized in that, in the refractory lining at the bottom adjacent to the vessel shell, a metallic, broom-like element connected to the positive pole of the electrical energy equipment. The bristles are embedded in the refractory lining and are directed toward the interior of the vessel and the refractory lining has metallic embedments adjacent the bristles. The proportion by volume of metal embedments to refractory material is less in the part of the furnace lining facing the interior of the vessel than in the lining adjacent the shell. There are no metal embedments at the interior surface of the lining in the wear layer which contacts the melt.

9 Claims, 3 Drawing Sheets

METALLURGICAL VESSEL FOR DIRECT-CURRENT ARC EQUIPMENT

FIELD OF THE INVENTION

The invention relates to a new and improved method for the production of a refractory lining in which an anode is provided at the bottom of a metallurgical vessel which such as a direct-current arc furnace, as well as to the metallurgical vessel which is produced by this new and improved method.

The content of German priority application P41 29 756.3 is incorporated by reference herein.

BACKGROUND OF THE INVENTION

As a consequence of the progress in the development of semiconductor components, a constantly increasing trend towards direct-current arc furnaces for melting and heating steel has ensued. Typically, the arc is formed between a cathode, which is disposed above the melt and protrudes into the vessel, and the melt itself. The direct current is returned by one or more anodes disposed in the region of the bottom of the vessel.

Since these anodes are subjected to a continuing high thermal stress, graphite is regularly used as anode material. These graphite electrodes characteristically have a high softening point and a high melting point. However, they possess the disadvantage that the graphite dissolves in contact with steel of low carbon content. This leads not only to high wear of the anode, which at the same time functions as a protective lining, but also to an impermissible carburization of the steel melt. The same is true for anodes of graphite-magnetite compositions, although it has been possible to reduce the carburization of the steel melt with such anodes.

Metallic electrodes are also used in direct-current arc furnaces. However, metallic electrodes are excluded from being used in ladle furnaces, since the metallic electrodes must be cooled intensively and a melting of the electrodes up to the melt break-out is to be avoided if for no other reason than work safety. Cooling of such metallic electrodes must be kept up during the entire period in which the melt is in the ladle. This leads to a high cost for keeping up the supply of cooling medium during the transport, possibly over long distances, from the smelting furnace to the converter or the ladle furnace, or it leads to structurally expensive electrodes such as shown in EP 0 167 037 B1.

The specification of EP 00 124 490 A1 discloses a direct-current anode comprising a prefabricated, removable, electrically conductive element which is in contact with metal bath. The element in this case is connected to an electrically conductive, grainy material, which lies on a metal plate having a metal rod. The prefabricated element can also consist of a refractory cast part with interspersed metal rods. The anode taught by this publication is different in structure and composition from the rest of the bottom of the direct-current arc furnace. Moreover, the metal rods embedded in the refractory casting have direct contact with the melt.

The German Offenlegungsschrift 27 53 198 discloses an electrode of a generator for the magneto-hydrodynamic generation of power. This electrode has a refractory ceramic matrix which contains 10 to 15% by volume of a continuous metal reinforcement. The surface of this electrode can consist of a refractory ceramic matrix which has not been reinforced. The place of use is a plasma, which may be an ionized or inert gas, in which temperatures up to 2,800° C. may be encountered. This leads to electrode-plasma temperatures of up to 2,100° C. Gas flows around this electrode which is standing apart and is in an environment which cannot be compared with a smelting vessel for metallic materials.

OBJECT OF THE INVENTION

The object of the present invention is to provide an anode for a vessel heated with direct current which avoids contamination and/or carburization of the melt as the anode is consumed, does not require a separate cooling medium supply, is rapidly available, and which anode can be maintained simply, expediently, and inexpensively.

SUMMARY OF THE INVENTION

This objective is accomplished by a method for the production of a refractory lining in a metallurgical vessel in which an anode of a direct-current arc furnace is provided in the region of the bottom of the vessel, characterized in that a metallic, broom-like element, having bristles directed towards the interior of the vessel, is positioned in a region of the furnace vessel which is free of refractory material and subsequently, at least in the region of the broom-like element, refractory gunite is applied thereto and a metallic composition is admixed during the guniting, and as the thickness of the applied gunite increases, the ratio of the metallic composition to the refractory composition is reduced, gunite only being sprayed in the region of the inner edge of the ladle. The practice of the method results in a metallurgical vessel for direct-current arc equipment, which has a cathode protruding into the vessel and at least one anode disposed in the refractory lining of the vessel characterized in that, in the refractory lining at the bottom adjacent to the vessel shell, a metallic, broom-like element is connected to the positive pole of the electrical energy equipment. The bristles are embedded in the refractory lining and are directed toward the interior of the vessel and the refractory lining has metallic embedments adjacent the bristles. The proportion by volume of metal embedments to refractory material is less in the part of the furnace lining facing the interior of the vessel than in the lining adjacent the shell. There are no metal embedments at the lining at the interior surface in the wear layer which contacts the melt.

In accordance with the present invention, during the lining of the metallurgical vessel, the anode is integrated in the refractory lining in a simple and efficient manner. This results in a metallurgical vessel with a lining, the wear layer of which consists of a solid construction. The anode itself thus is in a protected position and not exposed directly either to chemical, thermal, or erosive attack. The metallic parts of the inventive anode thus are under a refractory layer, which accomplishes its function without containing graphite. By these means carburization of the melt is avoided. Instead of carbon, the invention uses ceramic materials having a specific electric resistance which drops at high temperatures.

The first metallic portions of the anode are disposed at a depth, up to which wear is usually permitted. Subsequently, the anode is filled by simple means with a refractory material. Should wear affect parts of the anode which already have metallic portions, these could be replaced during the usual repair and maintenance of the lining, as required, after the vessel is emptied. On the whole, a high availability of the vessel or the ladles is ensured by these means.

DESCRIPTION OF THE DRAWINGS

An example of the invention is shown in the following drawing, in which.

DETAILED DESCRIPTION OF THE INVENTION

Figure 1:
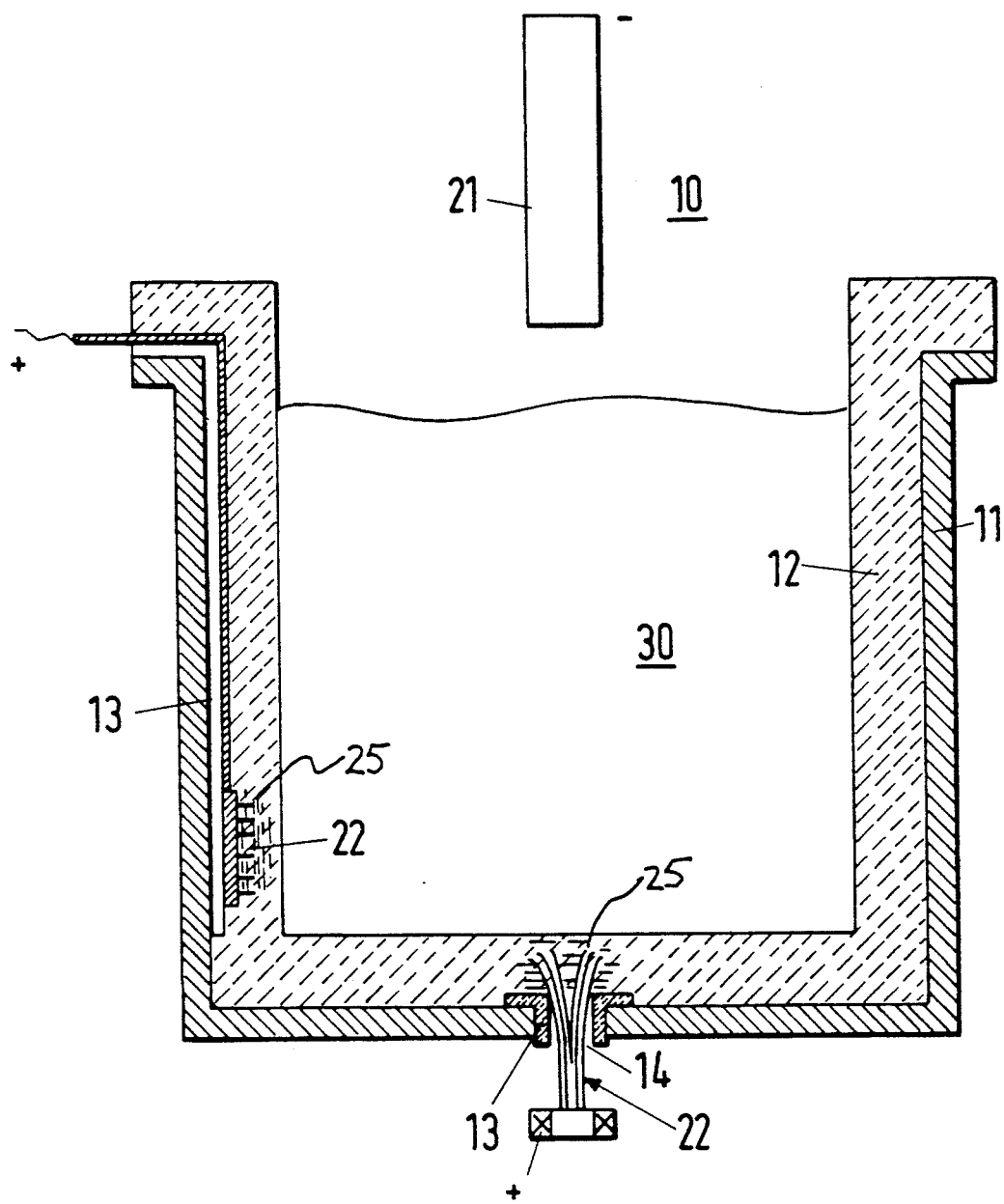
FIG. 1 shows a section through the furnace vessel.

FIG. 1 diagrammatically shows a ladle furnace with a vessel 10 and direct-current arc equipment 20. In vessel 10 there is a metallic melt 30.

The vessel 10 of the ladle furnace has a metal shell 11, on which a refractory lining 12 is provided. There is at least one bath electrode, a first anode 22, in the refractory lining 12.

The ladle furnace is heated by means of a direct current, which is conducted from the cathode 21 above the melt bath 30 through an arc into the melt bath 30 and through the anode 22 in contact with the bath.

In the bottom of the vessel 10 as shown in FIG. 1, anode 22 extends through an insulation 13 in opening 14 of the vessel.

In the left hand portion region on FIG. 1, an additional anode 22 is shown, which anode is disposed in the side wall of the refractory lining 12. Additional, insulation 13' is provided between the anode 22' and the line, which supplies current to the anode 22'.

Figure 2:
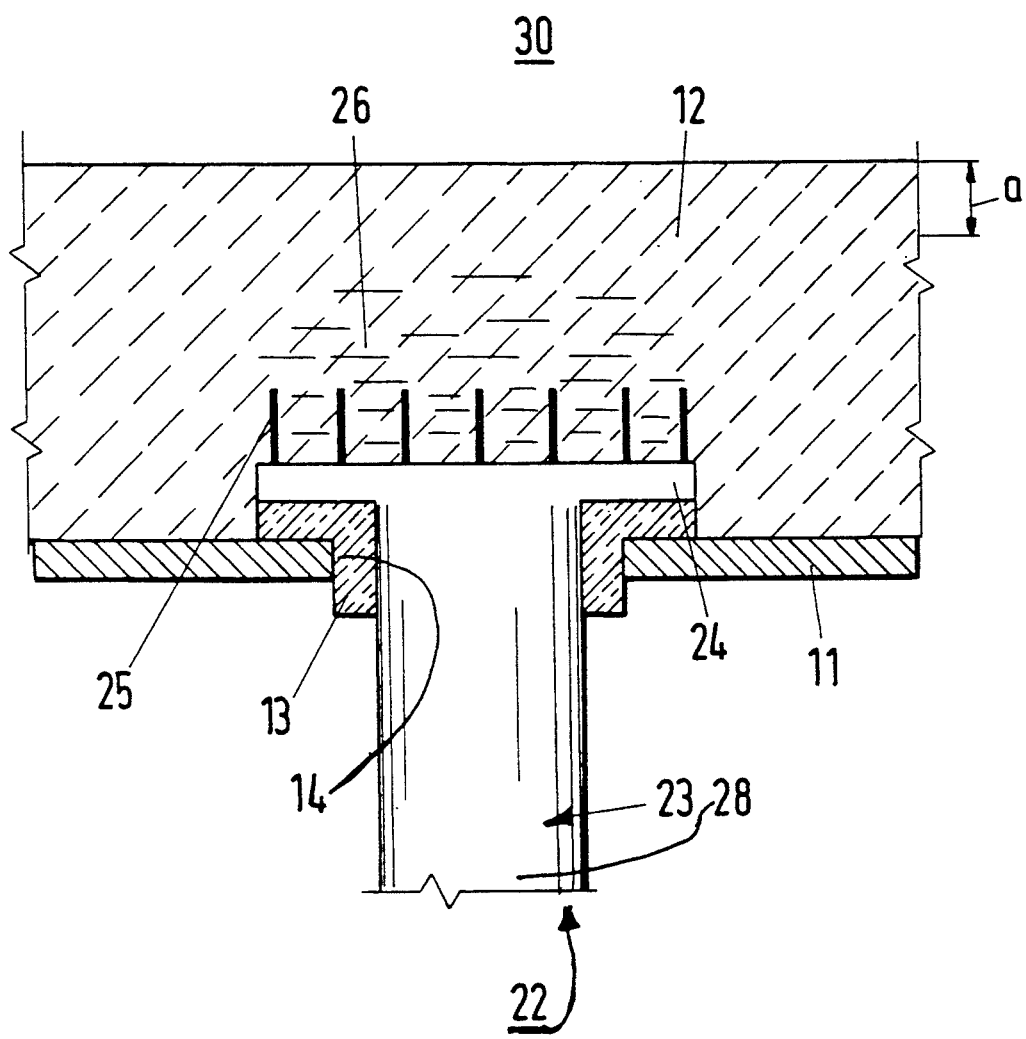
FIG. 2 shows an anode with the current-supplying rod.

In FIG. 2, an anode 22 is shown, which has a post-shaped element 23, which is passed through the opening 14 in the shell 11 and protected by the annular insulator 13. The post-shaped element 23 is constructed as a rod 28 which has a plate 24 at its head end. The plate 24 protrudes into the refractory lining 12 as shown.

On the side of the plate 24 away from the rod 28, metallic bristles 25 are mounted. In the refractory lining 12 in the region of the bristles 25 and over the head ends of the bristles pointing in the direction of the melt 30, metallic embedments 26 in the form of metal shavings or metal powder are provided. These metallic embedments 26 are spaced by at least a distance "a" from the edge of the refractory lining 12, the distance "a" taking into consideration the usual wear region of the refractory composition. In the melt-side region, the metallic content can be less, since the refractory lining has a sufficiently high electrical conductivity because of the high temperatures. In the refractory composition 12, the temperature decreases and the proportion of metal admixed increases in the direction of the metal casing 11 of the vessel 10 in order to ensure the necessary conductivity.

Figure 3:
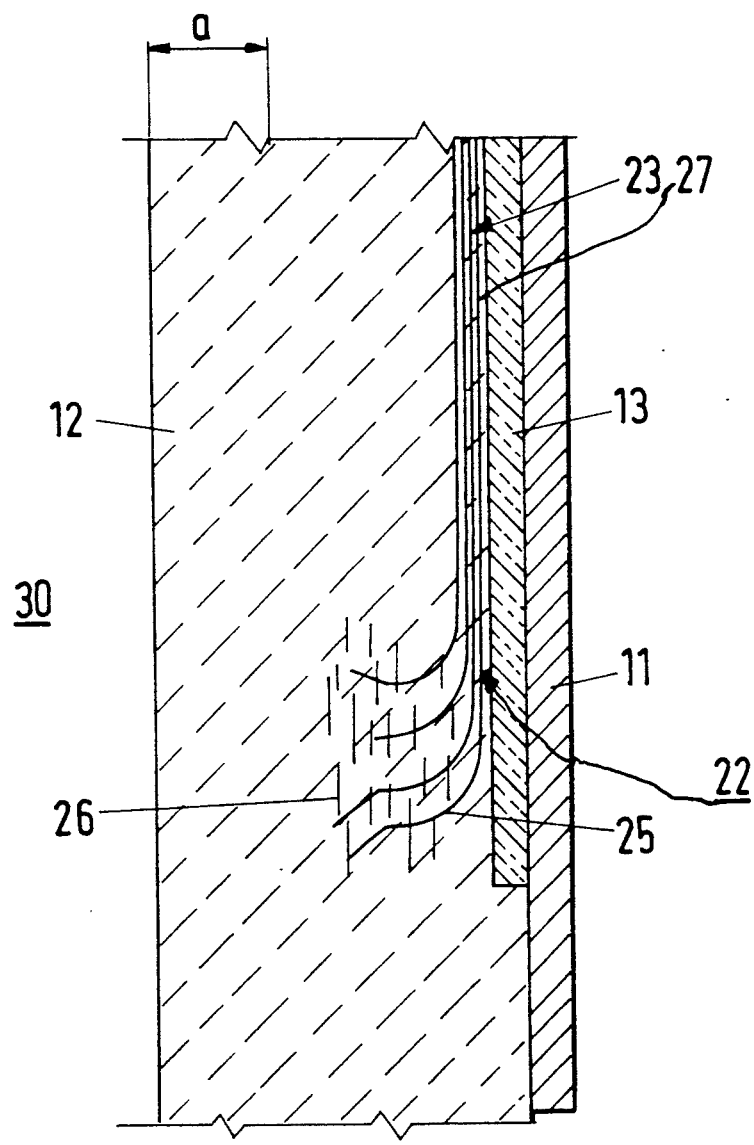
FIG. 3 shows an anode with the current-supplying cable.

FIG. 3 shows an anode 22, the post-shaped part 23 of which is constructed as a multi-strand cable 27 which is passed through the refractory lining 12 and insulated electrically from the metal casing 11 by the insulation 13.

The strands of the cable 27 are separated and aligned at the head end to provide bristles 25 which are embedded in the refractory lining 12 which are pointed in the direction of the melt 30.

As already shown in FIG. 2, a metallic embedment 26 is provided in the refractory lining 12 in the region of the bristles 25. This embedment 26 does not extend closer to the edge of the refractory lining 12 than the wear region that is labeled "a".

It will be appreciated that the foregoing description and the accompanying drawings are for illustrative purposes only, it being understood that variations in both the method and the apparatus within the scope and spirit of the invention will be apparent to those skilled in the art. Accordingly the scope of the invention is not intended to be limited except as set forth in the appended claims.

We claim:

1. A metallurgical vessel for direct-current arc equipment, said vessel having (i) an exterior metal shell and an interior, (ii) a refractory lining, (iii) a cathode protruding into the vessel, and (iv) at least one anode disposed in the refractory lining, comprising
   (a) a metallic, broom-like anode element with bristles being provided in the refractory lining adjacent exterior metal shell of the vessel;
   (b) a post-shaped element in the anode, said post-shaped element comprising wires twisted into cable, and being connected to the positive pole of an electrical source;
   (c) the bristles being embedded in the refractory lining pointing toward the interior of the vessel;
   (d) a metallic embedment in said refractory lining adjacent said bristles; and
   (e) the proportion by volume of metal embedment to refractory material is less in the portion of the refractory facing the interior of the vessel than in the portion immediately adjacent the shell.

2. The metallurgical vessel of claim 1, wherein the weight ratio of metal to refractory material in between 20 and 80%.

3. The metallurgical vessel of claim 2, wherein the post-shaped element passes through an opening in the shell.

4. The metallurgical vessel of claim 3, wherein an insulator is provided in the opening.

5. The metallurgical vessel of claim 2, wherein the post-shaped element in the metallic vessel passes between the refractory lining and the metal shell.

6. The metallurgical vessel of claim 5, wherein an insulation is provided between the post-shaped element and the metal shell.

7. The metallurgical vessel of claim 6, wherein the metallic embedment comprises metal chips.

8. The metallurgical vessel of claim 1, wherein the metallic embedment comprises metal powder.

9. The metallurgical vessel of claim 1, wherein said post-shaped element is fastened to a metal plate on which metallic bristles are disposed.

* * * * *